UNITED STATES PATENT OFFICE.

JAMES ARMSTRONG, OF BALTIMORE, MARYLAND; W. ERNEST F. ARMSTRONG ADMINISTRATOR OF SAID JAMES ARMSTRONG, DECEASED.

PROCESS OF DEODORIZING PETROLEUM DISTILLATE.

No. 837,655.　　　Specification of Letters Patent.　　　Patented Dec. 4, 1906.

Application filed December 30, 1904. Serial No. 239,023.

*To all whom it may concern:*

Be it known that I, JAMES ARMSTRONG, residing at Baltimore, State of Maryland, have invented certain new and useful Improvements in Processes of Deodorizing Petroleum Distillate; and I do declare the following to be a full, clear, and exact description of the invention, such as will enable others skilled in the art to which it appertains to make and use the same.

My invention relates to a process for treating petroleum distillate.

It has for its object to deodorize the distillate and bring it to a condition suitable for burning or illuminating purposes, free from offensive or unpleasant odor, and capable of use without forming or leaving a deposit to interfere with the satisfactory function of a lamp wick or burner.

To the accomplishment of the foregoing and such other objects as may hereinafter appear the invention will be hereinafter fully described and then sought to be clearly defined by the claims.

For one illustration of the invention it will be described as applied to the distillate obtained in the usual way from the petroleum or oil fields of Pennsylvania.

I first prepare a solution by dissolving forty (40) pounds of chlorinated lime in fifty (50) gallons of water and allowing it to stand for a period sufficient to permit the insoluble substances to precipitate and deposit in the vessel containing the solution. For instance, the solution is usually allowed to stand for a period of from twelve to fourteen hours, or thereabout. The liquid is then drawn off, so as to separate it from the precipitate. To this liquid is added a solution made by dissolving sixty (60) pounds of carbonate of soda in ten (10) gallons of water heated to a temperature of about 200° Fahrenheit, and the liquid with the carbonate-of-soda solution added is allowed to stand for a period of twelve (12) or fourteen (14) hours, or thereabout, so that the constituents for which the carbonate of soda has affinity may be precipitated. The resulting liquid is then drawn off into a separate vessel, separated from the precipitate, the liquid now being about fifty-two (52) gallons in volume. To this resulting liquid is added a mixture formed by dissolving one-half (½) pound of bichromate of potash in one quart of water, and the liquid with this mixture added is subjected to a thorough agitation. The mixture or solution thus formed and in volume being about fifty-two (52) gallons is added to four barrels of the distillate of fifty-two (52) gallons each. The distillate with the solution or mixture added is then thoroughly agitated for a period of twenty minutes, or thereabout, by means of a suitable blower or other suitable agitator, and the vessel containing the distillate is covered and the distillate with the added solution allowed to stand for a period of twenty-four (24) hours, or thereabout. The vessel is then opened and the mass agitated for a period of ten (10) minutes, or thereabout, and then allowed to stand uncovered for a period of twenty-four (24) or forty-eight (48) hours, or until the oil separates from the precipitated matter and becomes clear. The precipitate or deposit is now at the bottom of the vessel in a liquid or semiliquid state and consists of constituents of the distillate which have been separated therefrom and deposited in the vessel by the action of the solution or mixture upon the constituents of the distillate for which it has affinity. This final precipitate or deposit is then drawn off and leaves the oil in a clear state and deodorized and ready for commercial use.

The by-product consisting of the deposit made up of the constituents of the distillate separated therefrom by the action of the solution or mixture and precipitated forms a most efficient germicide and antiseptic adapted for use in hospitals and sick-rooms and for disinfecting purposes in general.

By the employment of this process there is saving of time and labor, and the oil does not require to be washed, as with some other methods, and, furthermore, there is no waste of material, as the by-product forms a germicide and disinfectant and the oil in its purified and deodorized state is ready for commercial use.

While I have mentioned chlorinated lime, carbonate of soda, and bichromate of potash as the substances from which the solution is made, yet where the chemical equivalents of those substances are employed to produce substantially the results given by the substances named such equivalents are to be understood as embraced within the scope of the invention, and while I have specified the proportions found to give the best results, yet variations in the proportions are comprised within the scope of the invention. It may also be mentioned that the precipitate of the chlorinated-lime solution either alone or mixed with the precipitate formed after the addition of the carbonate-of-soda solution may be used for disinfecting purposes either as a wash or as a coating for ceilings, walls, and otherwise.

The right is reserved to file a separate application for the germicide and antiseptic product as a division of this application.

Having described my invention and set forth its merits, what I claim is—

1. The process of deodorizing petroleum distillate consisting in subjecting the oil to a mixture formed of a solution of bichromate of potash added to a solution obtained by decomposing a solution of chlorid of lime by carbonate of soda, substantially as described.

2. The process of deodorizing petroleum distillate consisting in subjecting the oil to a mixture formed of a solution of bichromate of potash and a solution formed by decomposing a solution of chlorid of lime by the addition thereto of a solution of carbonate of soda, substantially in the proportions specified.

3. The process of making a mixture for deodorizing petroleum distillate consisting in making a chlorid-of-lime solution and separating the liquid from its precipitate; then adding to said liquid, a solution of carbonate of soda, and then adding to the mixture of the first two solutions, a solution of bichromate of potash, substantially as described.

4. The process of deodorizing petroleum distillate consisting in subjecting the oil, under agitation, to a mixture formed of a solution of chlorinated lime and a solution of carbonate of soda, and the addition of a solution of bichromate of potash to the mixture of the chlorinated-lime and carbonate-of-soda solutions, substantially as described.

In testimony whereof I affix my signature in presence of two witnesses.

JAMES ARMSTRONG.

Witnesses:
HOWARD D. ADAMS,
HARRY N. ABERCROMBIE.